US010689056B2

(12) United States Patent
Hendey

(10) Patent No.: US 10,689,056 B2
(45) Date of Patent: Jun. 23, 2020

(54) APPARATUS, SYSTEMS, AND METHODS FOR PREVENTING MIGRATION OF CONTAMINANTS WITHIN TUBING OF A FRAME

(71) Applicant: Matthew Hendey, Indianapolis, IN (US)

(72) Inventor: Matthew Hendey, Indianapolis, IN (US)

( * ) Notice: Subject to any disclaimer, the term of this patent is extended or adjusted under 35 U.S.C. 154(b) by 158 days.

(21) Appl. No.: 15/936,053

(22) Filed: Mar. 26, 2018

(65) Prior Publication Data

US 2018/0215436 A1    Aug. 2, 2018

Related U.S. Application Data

(63) Continuation-in-part of application No. 15/098,502, filed on Apr. 14, 2016, now Pat. No. 10,137,954.

(Continued)

(51) Int. Cl.
| | |
|---|---|
| *B62K 19/18* | (2006.01) |
| *B62J 1/08* | (2006.01) |
| *B62K 11/02* | (2006.01) |
| *B62K 19/34* | (2006.01) |
| *B62K 19/32* | (2006.01) |
| *B62M 6/55* | (2010.01) |

(Continued)

(52) U.S. Cl.
CPC .............. *B62K 19/18* (2013.01); *B62J 1/08* (2013.01); *B62K 11/02* (2013.01); *B62K 19/32* (2013.01); *B62K 19/34* (2013.01); *B60K 1/04* (2013.01); *B60Y 2200/13* (2013.01); *B62M 6/40* (2013.01); *B62M 6/55* (2013.01); *B62M 6/90* (2013.01)

(58) Field of Classification Search
CPC .......... B60K 1/04; B60Y 2200/13; B62J 1/08; B62K 19/18; B62K 19/32; B62K 19/34; B62K 11/02; B62M 6/40; B62M 6/90; B62M 6/55
USPC ....................................................... 180/220
See application file for complete search history.

(56) References Cited

U.S. PATENT DOCUMENTS

| | | | |
|---|---|---|---|
| 6,983,949 B2 * | 1/2006 | Ueno | B62J 6/18 280/279 |
| 7,566,065 B2 * | 7/2009 | Fukui | B62J 6/18 280/281.1 |

(Continued)

FOREIGN PATENT DOCUMENTS

EP    2003047 A1 *  12/2008   ............ B62J 11/02

*Primary Examiner* — Jacob D Knutson
*Assistant Examiner* — Felicia L. Brittman
(74) *Attorney, Agent, or Firm* — Roberts IP Law; John Roberts

(57) ABSTRACT

An apparatus, system, and method is provided for preventing the communication of contaminants between connected hollow interiors of tubes of a frame, such as a bicycle frame, for example. A hollow insert may be positioned inside a first tube of a frame such that seals on bottom and top portions of the insert are radially sealed against an interior surface of the first tube on either side of an open intersection between the first tube and other tubes of the frame, so that the interior of the first tube is not open to the interiors of the other tubes of the frame. Contaminants that then enter the first tube, such as through the headset of a bicycle head tube, for example, pass through the interior of the insert and out the bottom of the first tube, instead of passing into the interior of the frame.

16 Claims, 3 Drawing Sheets

Related U.S. Application Data

(60) Provisional application No. 62/478,791, filed on Mar. 30, 2017, provisional application No. 62/147,356, filed on Apr. 14, 2015.

(51) Int. Cl.
*B60K 1/04* (2019.01)
*B62M 6/90* (2010.01)
*B62M 6/40* (2010.01)

(56) References Cited

U.S. PATENT DOCUMENTS

| | | | |
|---|---|---|---|
| 8,302,981 B1 * | 11/2012 | Ma | B62K 21/06 280/279 |
| 9,096,287 B2 * | 8/2015 | Shadwell | B62J 99/00 |
| 2005/0057017 A1 * | 3/2005 | Hara | B62K 19/32 280/279 |
| 2006/0038376 A1 * | 2/2006 | Okajima | B62K 21/06 280/276 |
| 2016/0046346 A1 * | 2/2016 | Juarez | B62K 19/18 280/283 |
| 2018/0079462 A1 * | 3/2018 | Shirai | B62K 25/08 |

* cited by examiner

APPARATUS, SYSTEMS, AND METHODS FOR PREVENTING MIGRATION OF CONTAMINANTS WITHIN TUBING OF A FRAME

CROSS-REFERENCE TO RELATED APPLICATIONS

This application claims priority to, is a non-provisional of, and incorporates herein by reference, U.S. patent application Ser. No. 62/478,791 to Hendey et al., filed Mar. 30, 2017. This application also claims priority to, is a continuation-in-part of, and incorporates herein by reference, both U.S. patent application Ser. No. 15/098,502 to Hendey et al., filed Apr. 14, 2016 and published on Oct. 20, 2016 as US 2016/0303961 A1 ("the '502 application"), and the provisional patent application to which the '502 application claims priority, U.S. Pat. App. Ser. No. 62/147,356 to Hendey et al., filed Apr. 14, 2015.

FEDERALLY SPONSORED RESEARCH OR DEVELOPMENT

None.

TECHNICAL FIELD

The present invention relates generally to tubular frames for bicycles, motorcycles, and the like, and more particularly to sealing open joints where the tubes of such frames intersect.

BACKGROUND

Frames for bicycles, motorcycles, and the like are often formed by joining together sections of at least partially hollow tubing (regardless whether the tubing has a round or annular cross-section, rectangular cross-section, or cross-sections having one or more other geometries). The joints where such tubing sections intersect often include internal openings leading from one tube to another tube, which may form a passageway for water, oil or other types of moisture, dust, salt, sand, or other types of debris to migrate within the frame tubing. This can lead to unwanted, undetected, and potentially dangerous internal corrosion of the frame tubes and other components housed within the frame, such as bearings. In the case of electric bicycles that house electronic components at least partially within the tubing of the frame, the presence of moisture or other unwanted substances within the tubing of the frame can lead to failure of electronic components. Access points where liquid or solid substances from the outside environment can sometimes enter inside the tubing of a frame may include tubes that are open on at least one end, such as seat post tubes, swingarm tubes, crankshaft bottom brackets, and head tubes, for example.

Some efforts have been made to seal the tops of bicycle frame head tubes, for instance, from the outside environment. See for instance U.S. Pat. No. 7,441,961 B2 issued to Li on Oct. 28, 2008 ("Li"), which is incorporated herein by reference. But these efforts have been primarily directed to providing some (typically imperfect) protection for bearings housed within the tubes, and not to dealing with liquid or solid substances that enter the hollow frame tubes or to preventing migration of such materials within the tubes. A need remains for a feasible and robust way to prevent or impede liquid or solid substances from entering and migrating within the hollow tubes of a frame.

SUMMARY

The present invention(s) elegantly overcome many of the drawbacks of prior systems and provide numerous additional improvements and benefits as will be apparent to persons of skill in the art. For example, provided in various example embodiments is a frame tube sealing system, comprising: a frame, comprising: a first tube extending longitudinally from a first end to a second end and defining a first at least partially hollow interior having an interior surface defining a first cross-sectional shape; a second tube defining a second at least partially hollow interior; the first at least partially hollow interior open to the second at least partially hollow interior through an intersection between the first and second tubes that is located between the first and second ends; and an insert having a hollow body extending longitudinally from a bottom portion to a top portion, the bottom and top portions each having exterior surfaces defining a second cross-sectional shape sized and shaped to fit within and adjacent to the interior surface of the first tube, the bottom and top portions each comprising a seal configured to radially seal against the interior surface of the first tube on first and second sides of the intersection when the insert is positioned inside the first tube.

In various example embodiments the insert may be positioned inside the first tube such that the seals on the bottom and top portions of the insert are radially sealed against the interior surface of the first tube on the first and second sides of the intersection, such that the first at least partially hollow interior is not open to the second at least partially hollow interior through the intersection.

In various example embodiments the insert may further comprise a central portion between the bottom and top portions, the central portion having a third cross-sectional shape smaller than the second cross-sectional shape. In various example embodiments the exterior surfaces of the bottom and top portions may each comprise a groove therein with an elastomeric annulus, such as an O-ring, for instance, positioned in one or both grooves.

In various example embodiments the interior surface may define a cylinder, and any or all of the first, second, and third cross-sectional shapes may be circular. In various example embodiments the first tube may comprise a head tube, for instance as that term is understood with respect to bicycle frames. In various example embodiments the bottom and/or top portions of the insert may each define an opening into the hollow body of the insert. In various example embodiments the second at least partially hollow interior may contain electronics at least partially therein.

In various example embodiments the frame may comprise a third tube defining a third at least partially hollow interior, wherein the first at least partially hollow interior is open to the third at least partially hollow interior through the intersection. Further, the first at least partially hollow interior may be open to the third at least partially hollow interior through not only the first intersection, but also through a second open intersection between the second and third tubes.

Also provided in various example embodiments is a bicycle that may be powered at least in part by an electric motor, comprising a frame as described herein, for instance with the first tube comprising a head tube, and the second at least partially hollow interior containing electronics at least partially therein. In various example embodiments the electronics may comprise any or all of one or more batteries, an electric motor, and/or a controller, for example.

Further provided in various example embodiments is a method of preventing the communication of contaminants between connected hollow interiors of tubes of a frame, comprising the steps of: providing a frame and an insert as described herein; positioning the insert inside the first tube of the frame such that the seals on the bottom and top portions of the insert are radially sealed against the interior surface of the first tube of the frame on first and second sides of the intersection between the first and second tubes of the frame, so that the first at least partially hollow interior is not open to the second at least partially hollow interior through the intersection.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

FIG. 2A-A is a section view of the hollow cylindrical insert of FIG. 2A taken along line A-A.

FIG. 2B-B is a section view of the hollow cylindrical insert of FIG. 2B taken along line B-B.

DETAILED DESCRIPTION OF EXAMPLE EMBODIMENTS

Reference will now be made in detail to some specific example embodiments, including any best mode contemplated by the inventor. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments may be implemented without some or all of these features or specific details. In other instances, components and procedures well known to persons of skill in the art have not been described in detail in order not to obscure inventive aspects.

Various techniques and mechanisms will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the example techniques and mechanisms described herein will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
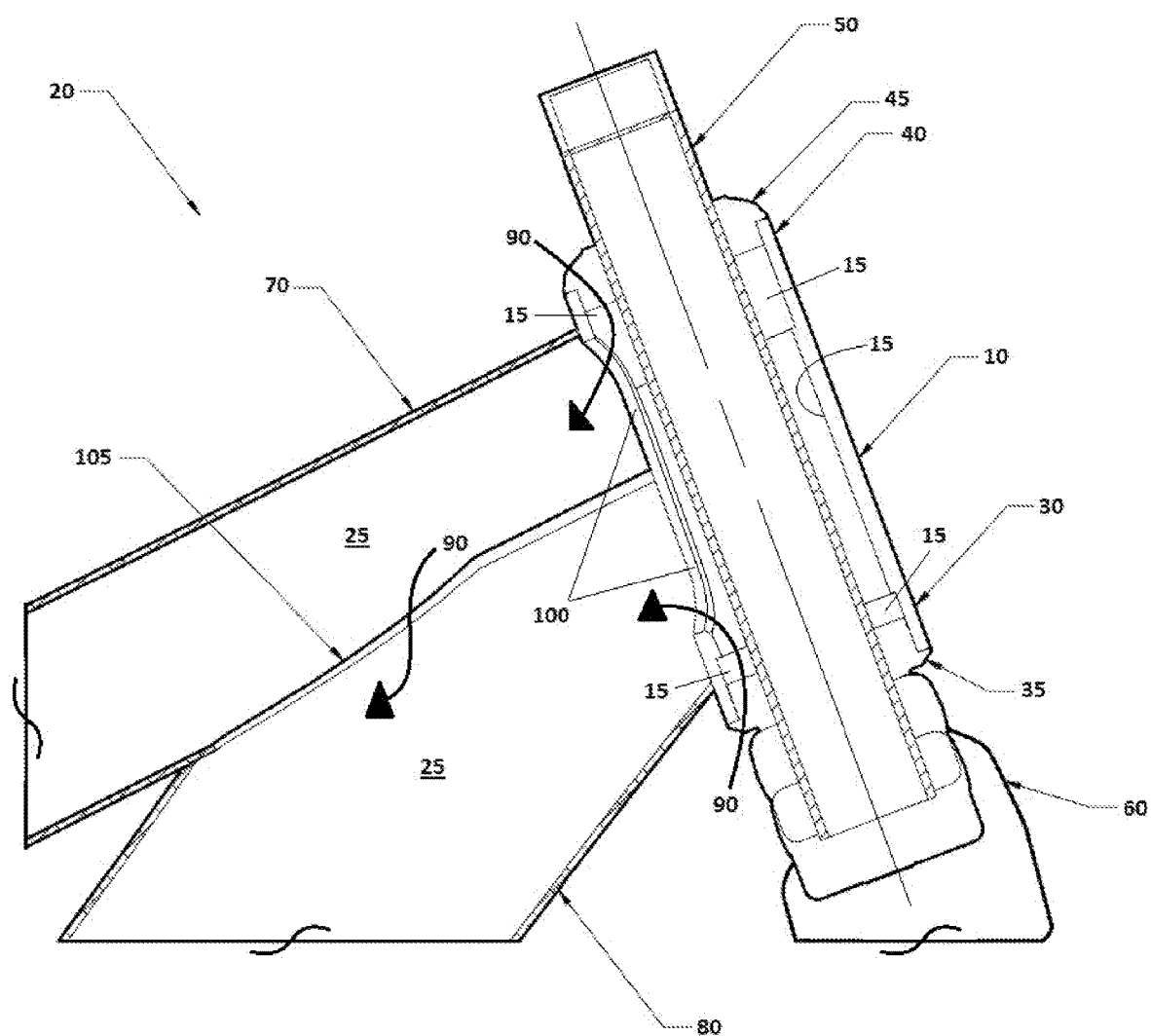
FIG. 1 illustrates a cross-sectional side elevation view of a head tube portion of a bicycle frame with a front fork and related components assembled therewith, showing potential travel paths of contaminants entering the interior of the frame.

While various example embodiments of the present invention may be applicable to many different types of tubes in many different types of frames for many different applications, to illustrate one example embodiment a bicycle frame head tube application will be described. With reference to FIG. 1, a head tube portion 10 of a bicycle frame 20 is typically a hollow cylinder in a roughly vertical orientation with an interior surface 15 typically defining a round cross-section that is open on both its lower end 30 and upper end 40 to receive and rotatably house the structure 50 that connects the handlebars (not shown in FIG. 1) to the front fork 60 to steer the bicycle (or motorcycle, scooter, or the like). Connected with the upper 40 and lower 30 ends of the head tube 10 is typically a set of bearings 35, 45, respectively, called the headset. The headset 35, 45, is not typically designed with a seal to prevent moisture or other contaminants 90 from entering the head tube 10, which then could reach the internal areas 25 of the at least partially hollow bike frame 20, for instance by migrating through an open intersection 100 between the head tube 10 and the top tube 70 and/or the down tube 80 as indicated by arrows 90, wherein the open intersection 100 is located between the first and second ends 30, 40, of the head tube 10. Once inside the interior 25 of the frame 20, moisture or other contaminants 90 can migrate through other openings, such as an open intersection 105 between the top tube 70 and the down tube 80, and to other components such as the bottom bracket (not shown in FIG. 1) where the crank and its bearings are located. In addition to causing corrosion of the internal surfaces 25 of the frame 20 as well as any bearings, cables, or other structures located therein, moisture or other contaminants 90 inside the bike frame 20 can cause system failure in the case of electrically-powered bicycles or similar apparatus that house some or all of their electrical components at least partially within the at least partially hollow tubing (e.g., 70, 80) of the frame 20.

Figure 2A:
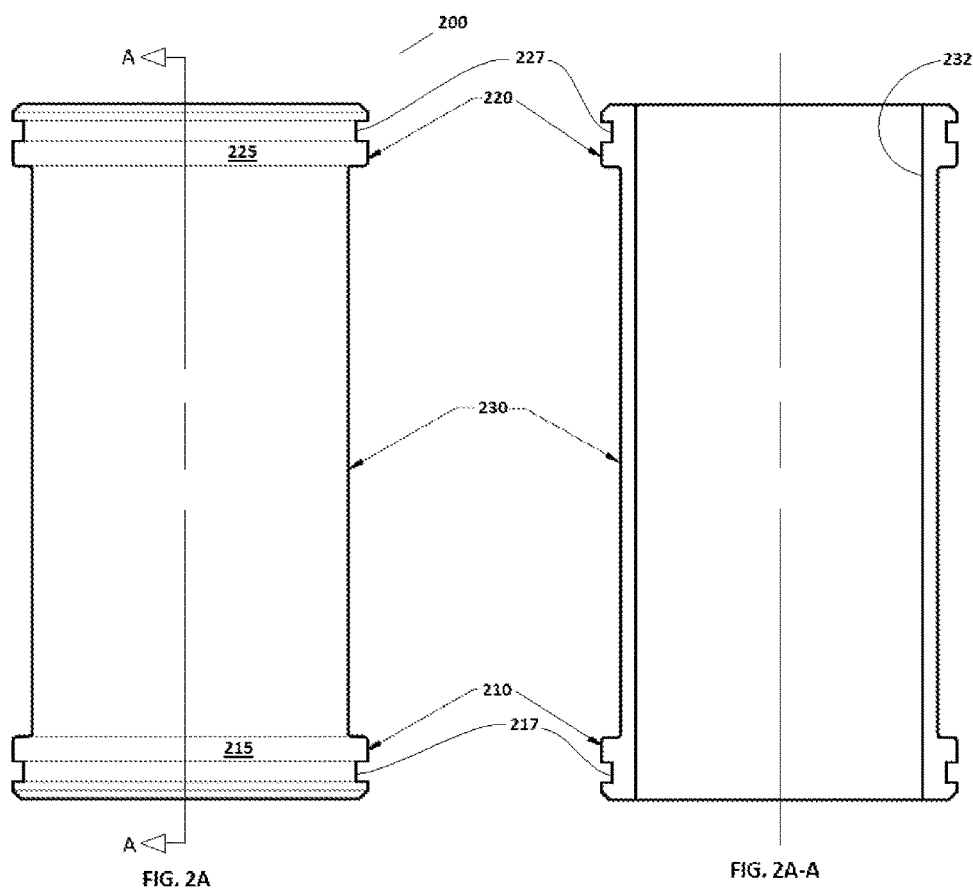
FIG. 2A is a side elevation view of a hollow cylindrical insert according various example embodiments.
Figure 2B:
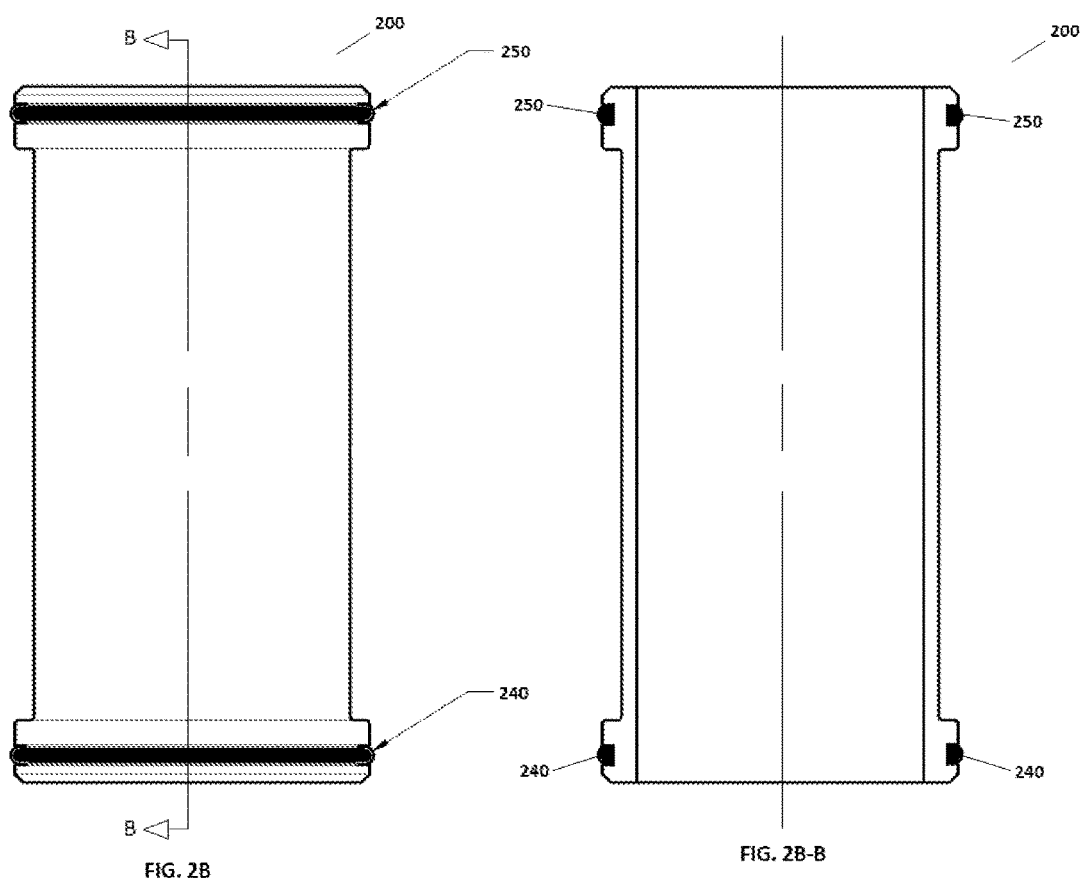
FIG. 2B is a side elevation view of the hollow cylindrical insert of FIG. 2A shown with example sealing members affixed therewith, according various example embodiments.
Figure 3:
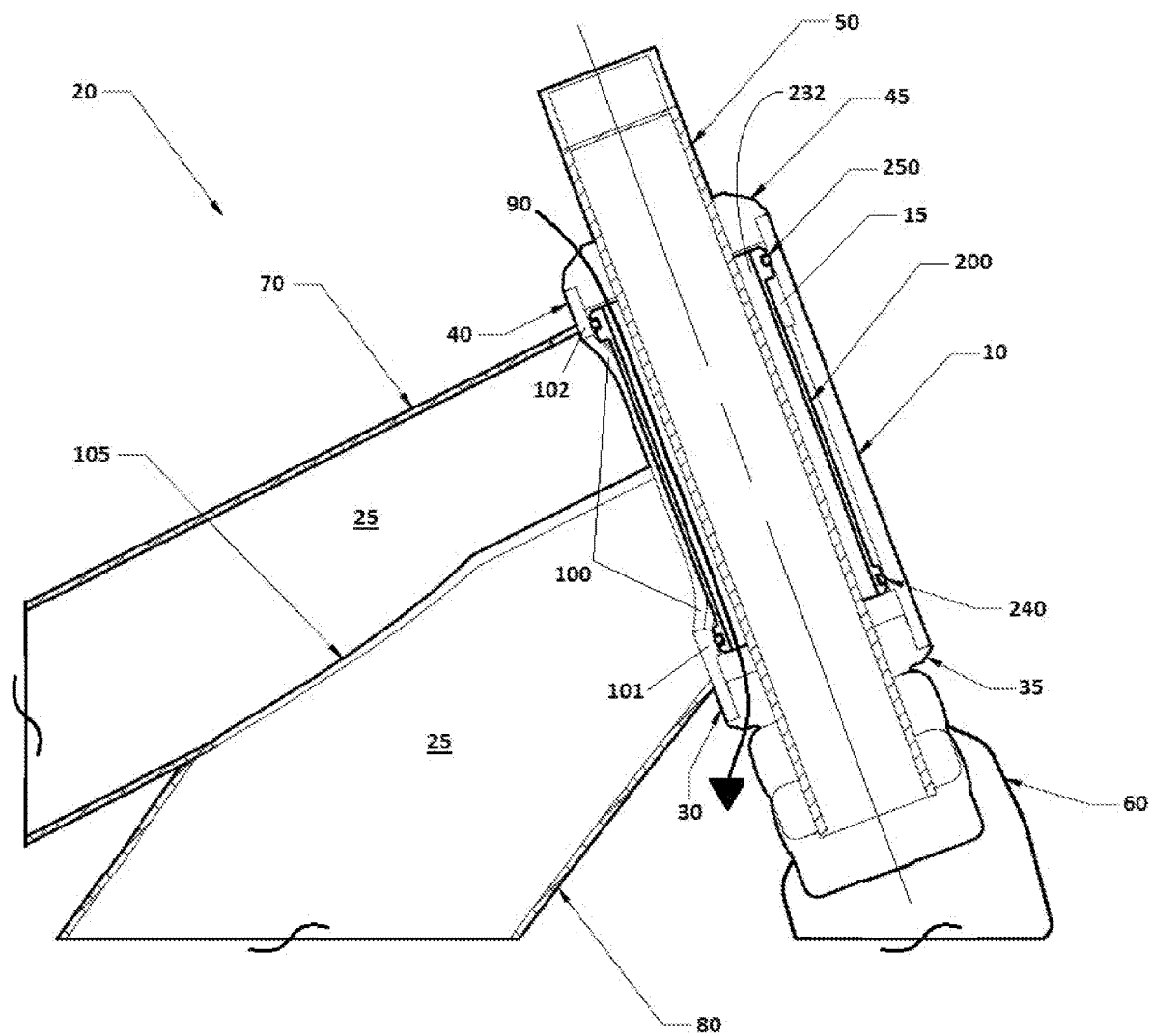
FIG. 3 illustrates a cross-sectional side elevation view of a head tube portion of a bicycle frame with a front fork and related components assembled therewith, having the insert of FIG. 2B inserted therein, showing how contaminants are thereby prevented from entering the interior of the frame.

With reference to FIGS. 2A through 3, provided in various example embodiments is a hollow insert 200 configured and positioned within the head tube 10 of a bicycle frame 20 to prevent or inhibit moisture or other contaminants 90 that get past the headset bearings 35, 45, from entering and migrating within the tubes (e.g., 70, 80) of the frame 20. As illustrated by arrow 90 in FIG. 3, the head tube seal insert 200 may accomplish this functionality by diverting such materials 90 from the top area 40 of a standard head tube 10, along an interior surface 232 of the insert 200, to the bottom side 30 of the head tube 10 to pass back out of the head tube 10 through the lower headset bearing 35, while preventing the materials 90 from entering through the open intersection 100 and then migrating between the tubes (e.g., 70, 80) of the frame 20. Leakage into the frame 20 may be prevented or minimized with a set of seals, such as O-rings 240, 250, positioned in grooves 217, 227, in lower and upper portions, 210, 220, of the insert 200.

For example, with reference to FIGS. 1-3, provided in various example embodiments is a frame tube sealing system, comprising: a frame 20, comprising: a first tube 10 extending longitudinally from a first end 30 to a second end 40 and defining a first at least partially hollow interior having an interior surface 15 defining a first cross-sectional shape (such as a circle, as indicated throughout the figures by the presence of a dashed centerline); a second tube 70 defining a second at least partially hollow interior 25; the first at least partially hollow interior 15 open to the second at least partially hollow interior 25 through an intersection 100 between the first and second tubes 10, 70 that is located between the first and second ends 30, 40; and an insert 200 having a hollow body extending longitudinally from a bottom portion 210 to a top portion 220, the bottom and top portions 210, 220 each having exterior surfaces 215, 225 defining a second cross-sectional shape (such as an annulus, that is concentric exterior 215, 225 and interior 232 circles, as indicated throughout the figures by the presence of a dashed centerline) sized and shaped to fit within and adjacent to the interior surface 15 of the first tube 10, the bottom and top portions 210, 220 each comprising a seal 240, 250 configured to radially seal against the interior surface 15 of the first tube 10 on first and second sides 101, 102 of the intersection 100 when the insert 200 is positioned inside the first tube 10.

In various example embodiments the insert 200 may be positioned inside the first tube 10 such that the seals on the bottom and top portions 210, 220 of the insert 200 are radially sealed against the interior surface 15 of the first tube 10 on the first and second sides 101, 102 of the intersection 100, such that the first at least partially hollow interior 15 is not open to the second at least partially hollow interior 25 through the intersection 100.

In various example embodiments the insert 200 may further comprise a central portion 230 between the bottom and top portions 210, 220, the central portion 230 having a third cross-sectional shape (such as an annulus, that is, concentric exterior and interior circular surfaces, as indicated throughout the figures by the presence of a dashed centerline) smaller than the second cross-sectional shape. In various example embodiments the exterior surfaces 215, 225 of the bottom and top portions 210, 220 may each comprise a groove 217, 227 therein with an elastomeric annulus 240, 250, such as an O-ring, for instance, positioned in one or both grooves 217, 227. Any suitable material and durometer may be used for elastomeric annulus 240, 250, such as, for example, a Nitrile 40 Durometer O-Ring appropriately dimensioned for the grooves 217, 227. In various example embodiments the lower portion 210 of the insert 200 (and thus also the exterior surface 215, groove 217, and elastomeric annulus 240) may be smaller or larger in diameter than the upper portion 220 (and thus also the exterior surface 225, groove 227, and elastomeric annulus 250), for instance where the interior surface 15 of the first tube 10 comprises more than one concentric cylindrical surface having different or varying diameters.

In various example embodiments the interior surface 15 may define one or more concentric cylindrical surfaces (as indicated by the presence of a dashed centerline), and any or all of the first, second, and third cross-sectional shapes defined by surfaces 15, 215 and 225, 230, may be circular (as indicated by the presence of dashed centerlines). In various example embodiments the first tube 10 may comprise a head tube, for instance as that term is understood with respect to bicycle frames. In various example embodiments the bottom and/or top portions 210, 220 of the insert 200 may each define an opening into the interior 232 of the hollow body of the insert 200, for instance the insert 200 may comprise a thin-walled hollow cylinder as shown in FIGS. 2A-A and 2B-B. Insert 200 may be formed from any suitable material, such as plastic, aluminum, steel, or the like. Frame 20 may be formed from any suitable material as is known in the art of frames, including but not limited to bicycle frames. In various example embodiments the second at least partially hollow interior 25 may contain electronics (not shown in FIGS. 1-3) at least partially therein, for instance as shown in one or more applications to which this application claims priority.

In various example embodiments the frame 20 may comprise a third tube 80 defining a third at least partially hollow interior 25, wherein the first at least partially hollow interior 15 is open to the third at least partially hollow interior 25 through the intersection 100. Further, the first at least partially hollow interior 15 may be open to the third at least partially hollow interior 25 through not only the first intersection 100, but also through a second open intersection 105 between the second and third tubes 70, 80.

Also provided in various example embodiments is a bicycle that may be powered at least in part by an electric motor, for instance as shown in one or more applications to which this application claims priority, comprising a frame 20 as described herein, for instance with the first tube 10 comprising a head tube, and the second at least partially hollow interior 25 containing electronics at least partially therein. In various example embodiments the electronics may comprise any or all of one or more batteries, an electric motor, and/or a controller, for example, for instance as shown in one or more applications to which this application claims priority.

Further provided in various example embodiments is a method of preventing the communication of contaminants 90 between connected hollow interiors 15, 25 of tubes 10, 70, 80, etc., of a frame 20, comprising the steps of: providing a frame 20 and an insert 200 as described herein; positioning the insert 200 inside the first tube 10 of the frame 20 such that the seals 240, 250 on the bottom and top portions 210, 200 of the insert 200 are radially sealed against the interior surface 15 of the first tube 10 of the frame 20 on first and second sides 101, 102 of the intersection 100 between the first and second tubes 10, 70 of the frame 20, so that the first at least partially hollow interior 15 is not open to the second at least partially hollow interior 25 through the intersection 100. In various example embodiments the insert 200 can be removed and replaced any number of times, and the seals 240, 250 can be replaced or serviced as necessary.

Any of the suitable technologies set forth and incorporated herein may be used to implement various example aspects of the invention as would be apparent to one of skill in the art. For example and not by way of limitation, inserts 200 may be adapted for use in tubes other than head tubes, such as swing arm tubes, bottom brackets, and the like, in bicycle frames, motorcycle frames, and any other suitable type of frame.

Although exemplary embodiments and applications of the invention are described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A frame tube sealing system, comprising:
   a frame, comprising: a first tube extending longitudinally from a first end to a second end and defining a first at least partially hollow interior having a first interior surface defining a first cross-sectional shape; a second tube having a second interior surface defining a second at least partially hollow interior; the first at least partially hollow interior open to the second at least partially hollow interior through an intersection between the first and second tubes that is located between the first and second ends; and
   an insert having a hollow body having a third interior surface defining a third at least partially hollow interior, the hollow body of the insert extending longitudinally from a bottom portion to a top portion, the bottom and top portions each having exterior surfaces defining a second cross-sectional shape sized and shaped to fit within and adjacent to the interior surface of the first tube, the bottom and top portions each comprising a seal configured to radially seal against the interior surface of the first tube on first and second sides of the intersection when the insert is positioned inside the first tube;
   wherein the insert is positioned inside the first tube such that the seals on the bottom and top portions of the insert are radially sealed against the interior surface of the first tube on the first and second sides of the intersection, such that the third at least partially hollow interior is not open to the second at least partially hollow interior through the intersection.

2. The frame tube sealing system of claim 1, the insert further comprising a central portion between the bottom and top portions, the central portion having a third cross-sectional shape smaller than the second cross-sectional shape.

3. The frame tube sealing system of claim 2, the first interior surface defining a cylinder, and the first, second, and third cross-sectional shapes are circular.

4. The frame tube sealing system of claim 1, the first interior surface defining a cylinder, and the first and second cross-sectional shapes are circular.

5. The frame tube sealing system of claim 1, the first tube comprising a bead tube.

6. The frame tube sealing system of claim 5, the second at least partially hollow interior containing electronics at least partially therein.

7. The frame tube sealing system of claim 1, the bottom and top portions of the insert each defining openings into the third at least partially hollow interior of the hollow body of the insert.

8. The frame tube sealing system of claim 1, the frame comprising a third tube defining a fourth at least partially hollow interior; the first at least partially hollow interior open to the fourth at least partially hollow interior through the intersection.

9. A bicycle that is powered at least in part by an electric motor, the bicycle comprising a frame according to claim 1.

10. The bicycle of claim 9, the first tube comprising a head tube, and the second at least partially hollow interior containing electronics at least partially therein.

11. The bicycle of claim 10, the electronics comprising one or more batteries.

12. The bicycle of claim 10, the electronics comprising the electric motor.

13. The bicycle of claim 10, the electronics comprising a controller.

14. The frame tube sealing system of claim 1, A frame tube sealing system, comprising:
   a frame, comprising: a first tube extending longitudinally from a first end to a second end and defining a first at least partially hollow interior having a first interior surface defining a first cross-sectional shape; a second tube having a second interior surface defining a second at least partially hollow interior; the first at least partially hollow interior open to the second at least partially hollow interior through an intersection between the first and second tubes that is located between the first and second ends; and
   an insert having a hollow body having a third interior surface defining a third at least partially hollow interior, the hollow body of the insert extending longitudinally from a bottom portion to a top portion, the bottom and top portions each having exterior surfaces defining a second cross-sectional shape sized and shaped to fit within and adjacent to the interior surface of the first tube, the bottom and top portions each comprising a seal configured to radially seal against the interior surface of the first tube on first and second sides of the intersection when the insert is positioned inside the first tube;
   wherein the exterior surfaces of the bottom and top portions each comprising a groove therein with an elastomeric annulus positioned in each groove.

15. The frame tube sealing system of claim 14, the elastomeric annulus comprising an O-ring.

16. A method of preventing the communication of contaminants between connected hollow interiors of tubes of a frame, comprising the steps of:
   providing a frame tube sealing system, comprising:
      a frame, comprising: a first tube extending longitudinally from a first end to a second end and defining a first at least partially hollow interior having a first interior surface defining a first cross-sectional shape; a second tube having a second interior surface defining a second at least partially hollow interior; the first at least partially hollow interior open to the second at least partially hollow interior through an intersection between the first and second tubes that is located between the first and second ends; and
      an insert having a hollow body having a third interior surface defining a third at least partially hollow interior, the hollow body of the insert extending longitudinally from a bottom portion to a top portion, the bottom and top portions each having exterior surfaces defining a second cross-sectional shape sized and shaped to fit within and adjacent to the interior surface of the first tube, the bottom and top portions each comprising a seal configured to radially seal against the interior surface of the first tube on first and second sides of the intersection when the insert is positioned inside the first tube;

positioning the insert inside the first tube of the frame such that the seals on the bottom and top portions of the insert are radially sealed against the interior surface of the first tube of the frame on first and second sides of the intersection between the first and second tubes of the frame, so that the third at least partially hollow interior is not open to the second at least partially hollow interior through the intersection.

* * * * *